(12) United States Patent
Akahori

(10) Patent No.: US 10,043,111 B2
(45) Date of Patent: Aug. 7, 2018

(54) MEDICAL IMAGE PROCESSING APPARATUS, MEDICAL IMAGE PROCESSING METHOD, AND MEDICAL IMAGE PROCESSING PROGRAM

(71) Applicant: FUJIFILM Corporation, Tokyo (JP)

(72) Inventor: Sadato Akahori, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 226 days.

(21) Appl. No.: 15/058,427

(22) Filed: Mar. 2, 2016

(65) Prior Publication Data

US 2016/0267655 A1    Sep. 15, 2016

(30) Foreign Application Priority Data

Mar. 12, 2015   (JP) .................................. 2015-049210

(51) Int. Cl.
*G06K 9/00* (2006.01)
*G06K 9/62* (2006.01)
(Continued)

(52) U.S. Cl.
CPC .............. *G06K 9/6267* (2013.01); *G06T 7/11* (2017.01); *G06T 7/13* (2017.01); *G06K 2209/05* (2013.01);
(Continued)

(58) Field of Classification Search
None
See application file for complete search history.

(56) References Cited

U.S. PATENT DOCUMENTS

| | | | |
|---|---|---|---|
| 7,095,881 B2 * | 8/2006 | Lelong | G06T 7/593 382/132 |
| 8,792,694 B2 | 7/2014 | Batman et al. | |

(Continued)

FOREIGN PATENT DOCUMENTS

| | | |
|---|---|---|
| JP | 2011-131040 A | 7/2011 |
| JP | 2014-121598 A | 7/2014 |

OTHER PUBLICATIONS

Alomari et al., "Labeling of Lumbar Discs Using Both Pixel- and Object-Level Features With a Two-Level Probabilistic Model", IEEE Transactions on Medical Imaging, vol. 30 No. 1, Jan. 2011, pp. 1-10.*

(Continued)

*Primary Examiner* — Matthew Bella
*Assistant Examiner* — Jose M Torres
(74) *Attorney, Agent, or Firm* — Sughrue Mion, PLLC

(57) ABSTRACT

There is provide a medical image processing apparatus, a medical image processing method, and a medical image processing program that can accurately specify at least either vertebral bodies or intervertebral discs included in the vertebra even if parts of the vertebral bodies and the intervertebral discs are deformed. A candidate detection unit detects intervertebral disc candidates and vertebral body candidates from a medical image, and a centerline detection unit detects a spine centerline. A distribution generation unit generates the distribution of a feature amount indicating the intervertebral disc likeness and a feature amount indicating the vertebral body likeness on the spine centerline. A specification unit specifies at least either the intervertebral discs or the vertebral bodies included in the medical image based on the distribution.

14 Claims, 17 Drawing Sheets

(51) Int. Cl.
*G06T 7/11* (2017.01)
*G06T 7/13* (2017.01)

(52) U.S. Cl.
CPC ........... *G06T 2207/10081* (2013.01); *G06T 2207/10088* (2013.01); *G06T 2207/10104* (2013.01); *G06T 2207/30012* (2013.01); *G06T 2207/30172* (2013.01)

(56) References Cited

U.S. PATENT DOCUMENTS

| | | | | |
|---|---|---|---|---|
| 8,891,848 B2* | 11/2014 | Blumfield | ............. | G06F 19/321 382/128 |
| 9,691,157 B2* | 6/2017 | Zhan | ............. | G06T 7/11 |
| 2008/0132784 A1* | 6/2008 | Porat | ............. | G06T 7/11 600/426 |
| 2009/0169087 A1* | 7/2009 | Doi | ............. | G06T 7/0012 382/132 |
| 2009/0202122 A1* | 8/2009 | Wang | ............. | A61B 5/103 382/128 |
| 2009/0245608 A1* | 10/2009 | Wan | ............. | G06T 7/73 382/131 |
| 2011/0021914 A1* | 1/2011 | Zheng | ............. | A61B 5/103 600/443 |
| 2011/0033104 A1* | 2/2011 | Klinder | ............. | G06T 7/0081 382/154 |
| 2011/0064291 A1* | 3/2011 | Kelm | ............. | G06T 7/0087 382/131 |
| 2011/0130653 A1* | 6/2011 | Wang | ............. | A61B 6/505 600/425 |
| 2011/0228995 A1* | 9/2011 | Batman | ............. | G06T 19/00 382/128 |
| 2012/0143090 A1* | 6/2012 | Hay | ............. | A61B 6/505 600/587 |
| 2013/0136322 A1* | 5/2013 | Zhan | ............. | G06T 7/73 382/128 |
| 2013/0322727 A1* | 12/2013 | Goto | ............. | G06T 1/0007 382/132 |
| 2014/0046169 A1* | 2/2014 | Liu | ............. | A61B 5/055 600/410 |
| 2015/0173701 A1* | 6/2015 | Major | ............. | A61B 6/5217 382/131 |
| 2015/0325018 A1* | 11/2015 | Ben Ayed | ............. | G06T 7/11 382/132 |
| 2016/0210742 A1* | 7/2016 | Weiss | ............. | B60R 25/00 |

OTHER PUBLICATIONS

Klinder et al., "Automated model-based vertebra detection, identification, and segmentation in CT images", Medical Image Analysis 13 (2009), pp. 471-482.*

Meelis Lootus, et al., "Vertebrae Detection and Labelling in Lumbar MR Images", MICCAI 2013, Oxford University, Mirada Medical, 12 pages.

* cited by examiner

MEDICAL IMAGE PROCESSING APPARATUS, MEDICAL IMAGE PROCESSING METHOD, AND MEDICAL IMAGE PROCESSING PROGRAM

CROSS-REFERENCE TO RELATED APPLICATIONS

The present application claims priority under 35 U.S.C. § 119 to Japanese Patent Application No. 2015-049210, filed Mar. 12, 2015, all of which are hereby expressly incorporated by reference into the present application.

BACKGROUND OF THE INVENTION

1. Field of the Invention

The present invention relates to a medical image processing apparatus, a medical image processing method, and a non-transitory computer readable medium storing a medical image processing program for specifying at least either vertebral bodies included in the vertebrae and intervertebral discs between the vertebral bodies in a medical image in which a plurality of vertebrae are included.

2. Description of the Related Art

The spinal cord serves to transmit messages between the brain and each part of the body, and is a very important part. Therefore, the spinal cord is protected by the spine that is formed by a plurality of vertebrae. In addition, damage to the vertebrae or the presence of a lesion in the vertebrae is checked for by interpreting tomographic images obtained by scanning a subject. In this case, for example, in order to specify a damaged vertebra or a vertebra with a lesion, it is necessary to recognize each vertebra. For this reason, various algorithms of vertebral segmentation, which is image processing for separating a plurality of vertebrae recognizably based on tomographic images and labeling each vertebra, have been proposed.

For example, U.S. Pat. No. 8,792,694B has proposed a method of segmenting the individual vertebrae by image recognition processing with a three-dimensional image obtained from tomographic images, such as computed tomography (CT) images or magnetic resonance imaging (MRI) images, as a target and automatically assigning numbers to other vertebrae when the user specifies the number of one vertebra. In the method disclosed in U.S. Pat. No. 8,792,694B, the assigned numbers are displayed so as to overlap the image. Accordingly, a mistake in the number of each vertebra is less likely to occur.

In addition, JP2011-131040A has proposed a method of generating sectional images of a surface crossing the central axis of each vertebra and a surface parallel to the central axis of each vertebra with a three-dimensional image as a target, calculating a feature amount indicating the sharpness of the sectional shape in each sectional image and a feature amount indicating the regularity of the arrangement of vertebrae, separating the vertebrae from each other by specifying the position of an intervertebral disc located between the vertebrae based on these feature amounts, and labeling a region of each of the separated vertebrae.

In Meelis Lootus, Timor Kadir, Andrew Zisserman: "Vertebrae Detection and Labelling in Lumbar MR Images", MICCAI 2013, a method of specifying the vertebrae and the sacrum based on the relationship between adjacent candidates after finding candidates for the vertebral bodies and the sacrum using a discriminator that has learned the shape characteristics of the vertebral bodies included in the vertebrae has been proposed. In the method disclosed in Meelis Lootus, Timor Kadir, Andrew Zisserman: "Vertebrae Detection and Labelling in Lumbar MR Images", MICCAI 2013, it is possible to assign a number to each vertebra based on the sacrum by estimating the sacrum.

In addition, JP2014-121598A has proposed a method of extracting a spinal region from a sagittal image of the spine, performing edge enhancement processing of the spinal region, and extracting an intervertebral disc region based on the result.

SUMMARY OF THE INVENTION

On the other hand, when performing diagnosis on the vertebrae, there is a case in which a three-dimensional image of the patient is not necessarily acquired and only a few sagittal images near the spine of the patient are captured. In the methods disclosed in U.S. Pat. No. 8,792,694B and JP2011-131040A, a three-dimensional image is a target. Accordingly, when only a few images are acquired as described above, it is not possible to specify the vertebrae. In contrast, in the method disclosed in JP2014-121598A, it is possible to specify an intervertebral disc even if only a few images are acquired. In the method disclosed in JP2014-121598A, however, an intervertebral disc region is extracted by emphasizing the edge. Accordingly, when the vertebra is deformed by compression fracture or the like or when the intervertebral disc is crushed and deformed, an edge not having an original shape is extracted. For this reason, in the method disclosed in JP2014-121598A, it is not possible to accurately specify the intervertebral disc region. Also in the method disclosed in Meelis Lootus, Timor Kadir, Andrew Zisserman: "Vertebrae Detection and Labelling in Lumbar MR Images", MICCAI 2013, when the vertebrae are deformed by compression fracture or the like, it is not possible to accurately specify the vertebral bodies included in the vertebrae.

The invention has been made in view of the aforementioned circumstances, and it is an object of the invention to provide a medical image processing apparatus, a medical image processing method, and a non-transitory computer readable medium storing a medical image processing program that can accurately specify at least either vertebral bodies or intervertebral discs included in the vertebrae even if parts of the vertebrae and the intervertebral discs are deformed.

A medical image processing apparatus according to the invention includes: candidate detection unit that detects intervertebral disc candidates and vertebral body candidates from a medical image including intervertebral discs and vertebral bodies ; and specification unit that specifies at least either the intervertebral discs or the vertebral bodies included in the medical image using the intervertebral disc candidates and the vertebral body candidates.

"Specification" means determining to which portion (region or voxel) of the medical image one or more of at least either intervertebral discs or vertebral bodies correspond. For example, "specification" includes specifying a region of an intervertebral disc and/or a vertebral body in the medical image or specifying a point inside the intervertebral disc and/or the vertebral body. When a plurality of intervertebral discs are included in the medical image, at least one of the intervertebral discs may be specified. When a plurality of vertebral bodies are included in the medical image, at least one of the vertebral bodies may be specified.

In the medical image processing apparatus according to the invention, the candidate detection unit may detect the intervertebral disc candidates and the vertebral body candidates by calculating a feature amount indicating the intervertebral disc likeness and a feature amount indicating the vertebral body likeness in the medical image.

In the medical image processing apparatus according to the invention, the specification unit may specify at least either the intervertebral discs or the vertebral bodies included in the medical image based on periodicity of a distribution of the intervertebral disc candidates and the vertebral body candidates.

The medical image processing apparatus according to the invention may further include: centerline detection unit that detects at least one of a spine centerline and a spinal cord centerline from the medical image; and distribution generation unit that generating a distribution of a feature amount indicating the intervertebral disc likeness and a feature amount indicating the vertebral body likeness by cumulatively adding the feature amount indicating the intervertebral disc likeness and the feature amount indicating the vertebral body likeness on at least one of the spine centerline and the spinal cord centerline with a sign of the feature amount indicating the intervertebral disc likeness or the feature amount indicating the vertebral body likeness being inverted. The specification unit may specify at least either the intervertebral discs or the vertebral bodies included in the medical image based on the distribution.

In this case, the specification unit may adapt the distribution to a periodic function or a quasi-periodic function set in advance in a direction of the spinal cord centerline or the spine centerline and specify at least either the intervertebral discs or the vertebral bodies included in the medical image based on the adapted periodic function or the adapted quasi-periodic function.

In the medical image processing apparatus according to the invention, the centerline detection unit may detect at least one of the spine centerline and the spinal cord centerline from the medical image using position information of the intervertebral disc candidates and the vertebral body candidates.

The medical image processing apparatus according to the invention may further include labeling unit that labels vertebrae including the specified vertebral bodies.

The medical image processing apparatus according to the invention may further include information acquisition unit that acquires additional information regarding at least either the specified intervertebral discs or the specified vertebral bodies.

The "additional information" is anatomical information regarding at least either the intervertebral discs or the vertebral bodies, which are obtained from the specified intervertebral discs or the specified vertebral bodies. For example, the additional information can be the direction of the central axis when approximating each vertebral body in a cylindrical shape, the length along the axis, and the length in a direction perpendicular to the axis.

In the medical image processing apparatus according to the invention, the medical image may be an MRI image.

In the medical image processing apparatus according to the invention, the medical image may be a sagittal sectional image.

In the medical image processing apparatus according to the invention, the candidate detection unit may detect the intervertebral disc candidates and the vertebral body candidates from a plurality of sagittal sectional images, and the specification unit may specify at least either the intervertebral discs or the vertebral bodies included in the medical image using the intervertebral disc candidates and the vertebral body candidates detected from the plurality of sagittal sectional images.

In the medical image processing apparatus according to the invention, the candidate detection unit may estimate a spinal region where a spine is present in the medical image and detect the intervertebral disc candidates and the vertebral body candidates from the spinal region.

The medical image processing apparatus according to the invention may further include isolated candidate removing unit that removes an isolated candidate from the intervertebral disc candidates and the vertebral body candidates.

The isolated candidate unit a candidate that cannot be regarded as an intervertebral disc or a vertebral body due to being different from an actual intervertebral disc or an actual vertebral body even though the candidate has been detected as an intervertebral disc or a vertebral body. For example, when the feature amount of a certain intervertebral disc candidate is greatly different from the feature amounts of a plurality of other intervertebral disc candidates, the candidate can be determined to be an isolated candidate.

In the medical image processing apparatus according to the invention, the candidate detection unit may further detect at least either upper spine end candidates or lower spine end candidates, and the specification unit may specify at least either the intervertebral discs or the vertebral bodies using at least either the upper spine end candidates or the lower spine end candidates, the intervertebral disc candidates, and the vertebral body candidates.

A medical image processing method according to the invention includes: detecting intervertebral disc candidates and vertebral body candidates from a medical image including intervertebral discs and vertebral bodies; and specifying at least either the intervertebral discs or the vertebral bodies included in the medical image using the intervertebral disc candidates and the vertebral body candidates.

In addition, a non-transitory computer readable medium storing a program causing a computer to execute the medical image processing method according to the invention may be provided.

According to the invention, intervertebral disc candidates and vertebral body candidate sare detected from the medical image including the intervertebral discs and the vertebral bodies, and at least either the intervertebral discs or the vertebral bodies included in the medical image is specified using the intervertebral disc candidates and the vertebral body candidates. Accordingly, even if parts of the intervertebral discs and the vertebral bodies are deformed, it is possible to accurately specify at least either the intervertebral discs or the vertebral bodies by using both the intervertebral disc candidates and the vertebral body candidates.

DESCRIPTION OF THE PREFERRED EMBODIMENTS

Figure 1:
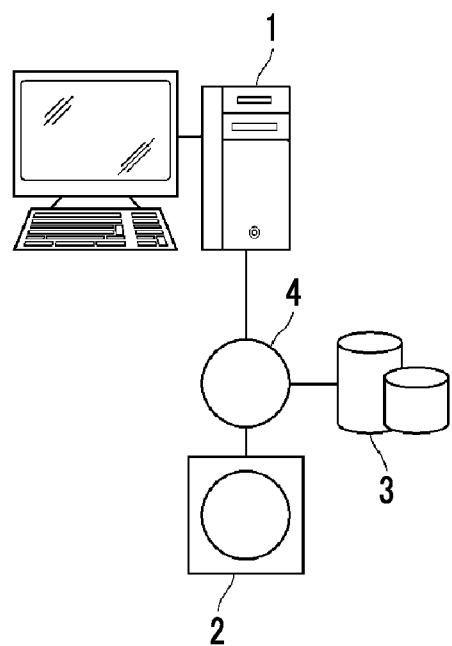
FIG. 1 is a diagram schematically showing the hardware configuration of a diagnostic support system to which a medical image processing apparatus according to a first embodiment of the invention is applied.

Hereinafter, embodiments of the invention will be described with reference to the diagrams. FIG. 1 is a diagram schematically showing the hardware configuration of a diagnostic support system to which a medical image processing apparatus according to a first embodiment of the invention is applied. As shown in FIG. 1, in this system, a medical image processing apparatus 1 according to the first embodiment, an image capturing apparatus 2, and an image storage server 3 are communicably connected to each other through a network 4.

The image capturing apparatus 2 is an apparatus that generates a medical image showing a part to be examined in a subject by imaging the part. Specifically, the image capturing apparatus 2 is a CT apparatus, an MRI apparatus, a positron emission tomography (PET) apparatus, or the like. The medical image generated by the image capturing apparatus 2 is transmitted to the image storage server 3 and is stored therein. In the present embodiment, it is assumed that the part to be examined in the subject is a spine, the image capturing apparatus 2 is an MRI apparatus, and the medical image is a medical image of a sagittal section including the spine. In addition, it is assumed that a plurality of medical images are generated at predetermined intervals in a range including the spine.

The image storage server 3 is a computer that stores and manages various kinds of data, and includes a large-capacity external storage device and software for database management. The image storage server 3 performs communication with other devices through the wired or wireless network 4 to transmit and receive image data or the like. Specifically, the image storage server 3 acquires image data, such as a medical image generated by the image capturing apparatus 2, through the network, and stores the image data in a recording medium, such as a large-capacity external storage device, and manages the image data. The storage format of image data or the communication between devices through the network 4 is based on protocols, such as a digital imaging and communication in medicine (DICOM). A tag based on the DICOM standard is given to the medical image. The tag includes information, such as a patient name, information indicating an imaging apparatus, imaging date and time, and an imaging part.

The medical image processing apparatus 1 is realized by installing a medical image processing program of the invention in one computer. The computer may be a workstation or a personal computer that is directly operated by a doctor who performs diagnosis, or may be a server computer connected to these through a network. The medical image processing program is distributed by being recorded on a recording medium, such as a digital versatile disc (DVD) or a compact disc read only memory (CD-ROM), and is installed into the computer from the recording medium. Alternatively, the medical image processing program is stored in a storage device of a server computer connected to the network or in a network storage so as to be accessible from outside, and is downloaded and installed into a computer used by a doctor when necessary.

Figure 2:
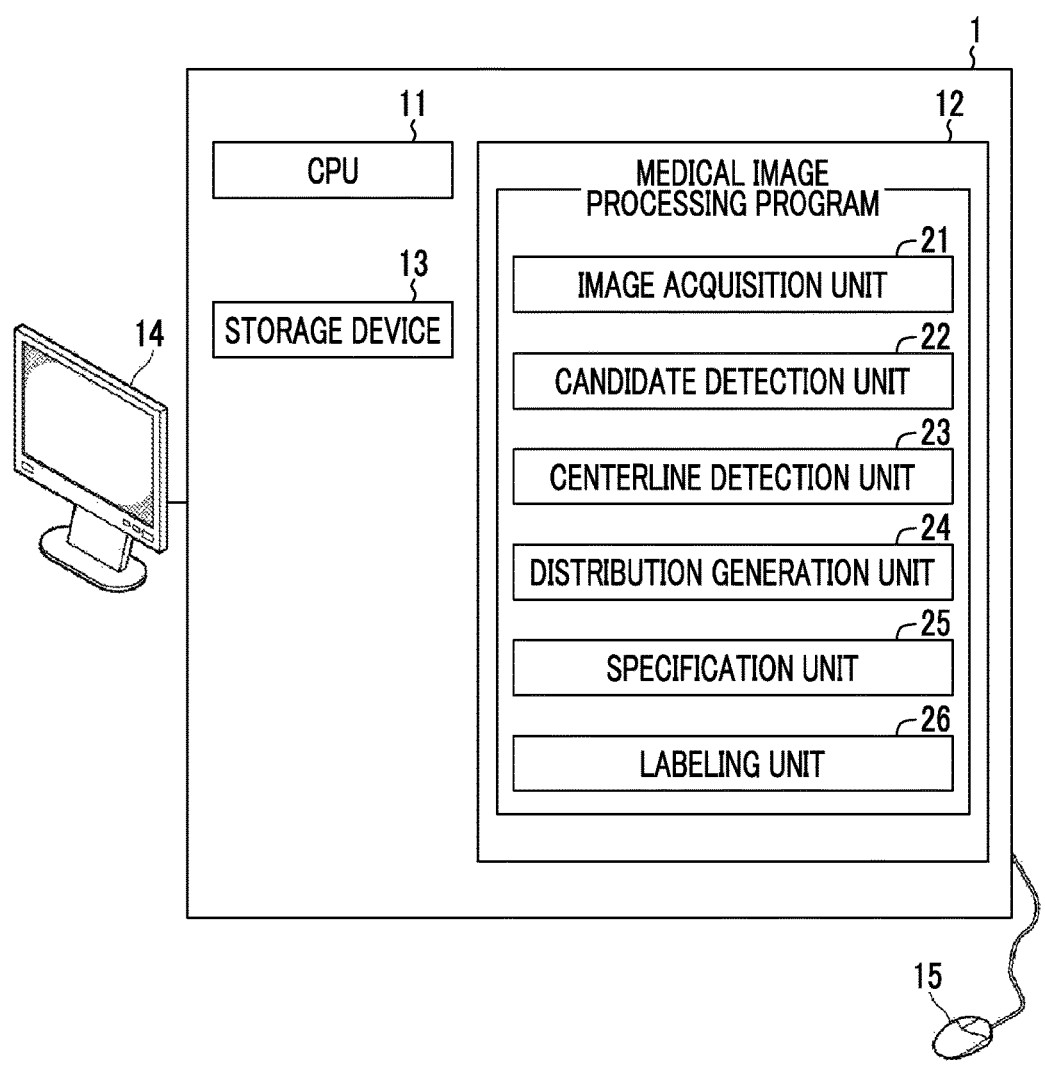
FIG. 2 is a diagram showing the schematic configuration of a medical image processing apparatus realized by installing a medical image processing program in a computer.

FIG. 2 is a diagram showing the schematic configuration of a medical image processing apparatus realized by installing a medical image processing program in a computer. As shown in FIG. 2, the medical image processing apparatus 1 includes a central processing unit (CPU) 11, a memory 12, and a storage device 13 as the configuration of a standard workstation. A display 14 and an input unit 15, such as a mouse, are connected to the medical image processing apparatus 1.

Medical images acquired from the image storage server 3 through the network 4, images generated by the processing in the medical image processing apparatus 1, and various kinds of information including information required for processing are stored in the storage device 13.

A medical image processing program is stored in the memory 12. As processing executed by the CPU 11, the medical image processing program defines image acquisition processing for acquiring a medical image of the subject that includes the spine to be diagnosed and that has been acquired by the image capturing apparatus 2, candidate detection processing for detecting an intervertebral disc candidate and a vertebral body candidate from the medical image, centerline detection processing for detecting at least one of the spine centerline or the spinal cord centerline from the medical image, distribution generation processing for generating the distribution of a feature amount indicating the intervertebral disc likeness and a feature amount indicating the vertebral body likeness by cumulatively adding the feature amount indicating the intervertebral disc likeness and the feature amount indicating the vertebral body likeness on at least one of the spine centerline and the spinal cord centerline with the sign of the feature amount indicating the intervertebral disc likeness or the feature amount indicating the vertebral body likeness being inverted, and specification processing for specifying at least either the intervertebral disc or the vertebral body included in the medical image based on the distribution. In addition, the medical image processing program defines labeling processing for labeling a vertebra including a specified vertebral body when a vertebral body is specified. In the present embodiment, a plurality of medical images for a plurality of sagittal sections are acquired, and both an intervertebral disc and a vertebral body are specified using one medical image to be processed among the plurality of sagittal sections.

The CPU 11 executes these processes according to the program, so that the computer functions as an image acquisition unit 21, a candidate detection unit 22, a centerline detection unit 23, a distribution generation unit 24, a specification unit 25, and a labeling unit 26. The medical image processing apparatus 1 may include a plurality of processors that perform image acquisition processing, candidate detection processing, centerline detection processing, distribution generation processing, specification processing, and labeling processing.

The image acquisition unit 21 acquires a plurality of medical images from the image storage server 3. When a plurality of medical images are already stored in the storage device 13, the image acquisition unit 21 may acquire the plurality of medical images from the storage device 13. In the medical image, a body axis direction on the sagittal section is assumed to be the z axis, and the left and right direction in the subject in which sagittal sections are aligned is assumed to be the x axis. In addition, a direction from the back of the subject to the ventral side in the medical image is assumed to be the y axis.

The candidate detection unit 22 detects an intervertebral disc candidate and a vertebral body candidate from a medical image S1 to be processed among a plurality of medical images. Specifically, the candidate detection unit 22 detects an intervertebral disc candidate and a vertebral body candidate by calculating a feature amount indicating the intervertebral disc likeness and a feature amount indicating the vertebral body likeness in the medical image S1. Accordingly, the candidate detection unit 22 includes a 2-class discriminator obtained by machine learning of intervertebral discs and vertebral bodies.

Figure 3:
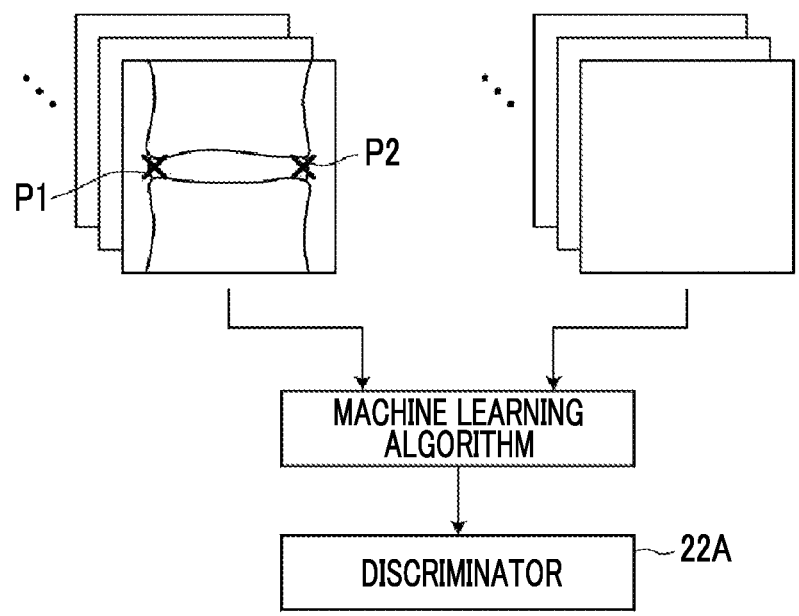
FIG. 3 is a diagram for explaining the machine learning of a discriminator for determining an intervertebral disc candidate.

FIG. 3 is a diagram for explaining the machine learning of a discriminator for intervertebral disc candidates. First, for a discriminator 22A for intervertebral discs, a plurality of teacher images of the intervertebral disc are prepared. A teacher image of the intervertebral disc is acquired by setting both ends of an intervertebral disc to reference points P1 and P2 in an image including an intervertebral disc and cutting a region in the image including vertebral bodies, the region is standardized so that the two reference points P1 and P2 become positions set in advance and a shape and a size set in advance are obtained, from the actual medical image. Although the teacher image is assumed to be a square having a midpoint of the reference points P1 and P2 as an intersection of the diagonal lines in the present embodiment, the invention is not limited thereto. In addition, teacher images not for an intervertebral disc are prepared. Then, by performing learning using a machine learning algorithm, such as boosting, with the teacher images of the intervertebral disc as positive teacher images and teacher images not for an intervertebral disc as negative teacher images, the discriminator 22A for intervertebral discs is acquired. The discriminator 22A for intervertebral discs outputs a score for the input image, and determines whether or not the input image is an intervertebral disc candidate based on the score. The output score is a feature amount indicating the intervertebral disc likeness. Accordingly, as the feature amount that is output increases, the intervertebral disc likeness of the input image increases, and the input image is determined to be an intervertebral disc candidate.

Figure 4:
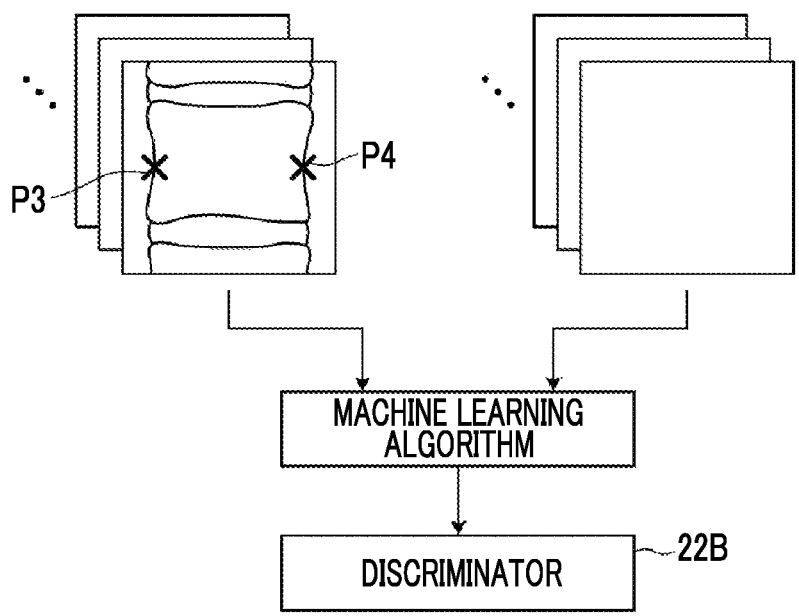
FIG. 4 is a diagram for explaining the machine learning of a discriminator for determining a vertebral body candidate.

FIG. 4 is a diagram for explaining the machine learning of a discriminator for vertebral body candidates. For a discriminator 22B for vertebral bodies, a plurality of teacher images of the vertebral body are prepared. A teacher image of the vertebral body is acquired by setting both ends at the approximately central position in the thickness direction of a vertebral body to reference points P3 and P4 in an image including a vertebral body and cutting a region, which is standardized so that the two reference points P3 and P4 become positions set in advance and a shape and a size set in advance are obtained, from the actual medical image. Although the teacher image is assumed to be a square having a midpoint of the reference points P3 and P4 as an intersection of the diagonal lines in the present embodiment, the invention is not limited thereto. In addition, teacher images not for the vertebral body are prepared. Then, by performing learning using a machine learning algorithm, such as boosting, with the teacher images of the vertebral body as positive teacher images and teacher images not for the vertebral body as negative teacher images, the discriminator 22B for vertebral bodies is acquired. The discriminator 22B for vertebral bodies outputs a score for the input image, and determines whether or not the input image is a vertebral body candidate based on the score. The output score is a feature amount indicating the vertebral body likeness. Accordingly, as the feature amount that is output increases, the vertebral body likeness of the input image increases, and the input image is determined to be a vertebral body candidate.

Figure 5:
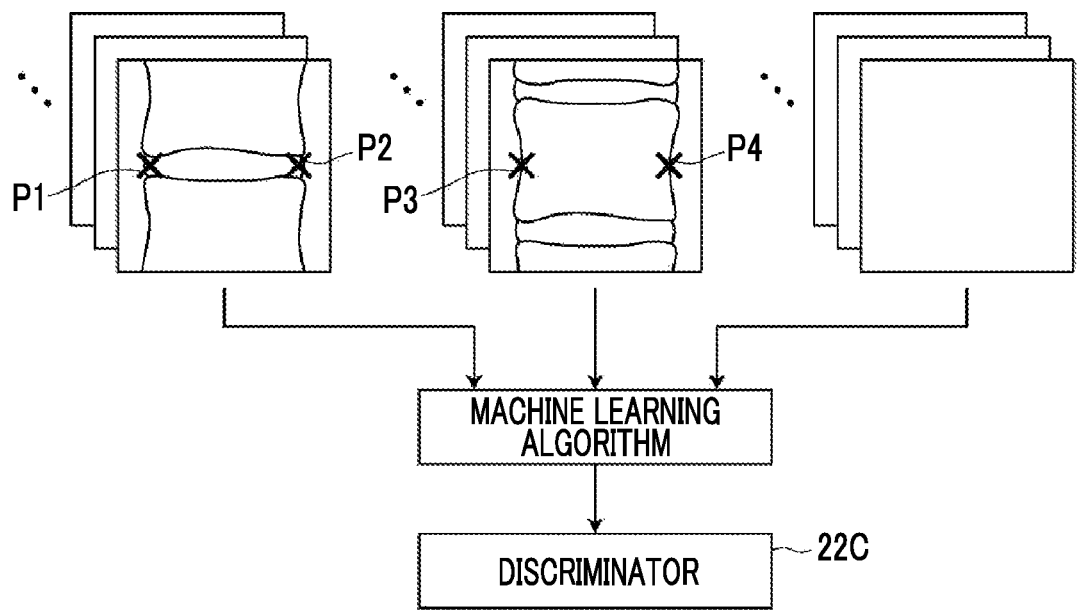
FIG. 5 is a diagram for explaining the machine learning of a multi-class discriminator for determining an intervertebral disc candidate and a vertebral body candidate.

Discriminators provided in the candidate detection unit 22 are not limited to two classes of the discriminator 22A for intervertebral discs and the discriminator 22B for vertebral bodies, and a multi-class discriminator 22C that has learned the teacher images of the intervertebral disc and the teacher images of the vertebral body may also be used as shown in FIG. 5. In this case, the discriminator 22C outputs both a feature amount indicating the intervertebral disc likeness and a feature amount indicating the vertebral body likeness for the input image. Accordingly, as the feature amount of the intervertebral disc likeness that is output increases, the intervertebral disc likeness of the input image increases. In addition, as the feature amount of the vertebral body likeness that is output increases, the vertebral body likeness of the input image increases.

The candidate detection unit 22 cuts out a square region from the medical image S1, and inputs the cut-out region to the discriminators 22A and 22B. The discriminator 22A outputs a feature amount C1 indicating the intervertebral disc likeness for the cut-out region. Then, the discriminator 22A compares the output feature amount C1 with a threshold value Th1, and determines that the cut-out region is an intervertebral disc candidate and stores the feature amount C1 and the position information of the region when the feature amount C1 exceeds the threshold value Th1. The position information of the region is assumed to indicate the position of an intersection of the diagonal lines of the region. In the present embodiment, in the positive teacher image of the intervertebral disc, the midpoint of the reference points P1 and P2, that is, the midpoint of both ends of the intervertebral disc, is an intersection of the diagonal lines of the teacher image. Accordingly, a position information of a region determined to be an intervertebral disc candidate is located near the midpoint of both ends of the intervertebral disc (hereinafter, referred to as a midpoint of the intervertebral disc).

On the other hand, the discriminator 22B outputs a feature amount C2 indicating the vertebral body likeness for the cut-out region. Then, the discriminator 22B compares the output feature amount C2 with a threshold value Th2, and determines that the cut-out region is a vertebral body candidate and stores the feature amount C2 and the position information of the region when the feature amount C2 exceeds the threshold value Th2. The position information of the region is assumed to indicate the position of an intersection of the diagonal lines of the region. In the present embodiment, in the positive teacher image of the vertebral body, the midpoint of the reference points P3 and P4, that is, the midpoint of both ends at the approximately central position in the thickness direction of the vertebral body, is an intersection of the diagonal lines of the teacher image. Accordingly, a position information of a region determined to be a vertebral body candidate is located near the midpoint of both ends at the approximately central position in the thickness direction of the vertebral body (hereinafter, referred to as the center of the vertebral body).

The candidate detection unit 22 detects a plurality of intervertebral disc candidates and a plurality of vertebral body candidates by cutting out regions for different positions, different sizes, and different rotation angles in the medical image S1 and repeating the above-described determination using the cut-out region. For the different sizes, for example, regions of ten kinds of size of 10 pixels×10 pixels to 100 pixels×100 pixels may be cut out at intervals of 10 pixels at the same position. For the different rotation angles, for example, regions of twelve kinds of rotation angle may be cut out at intervals of 30° at the same position and the same size.

Figure 6:
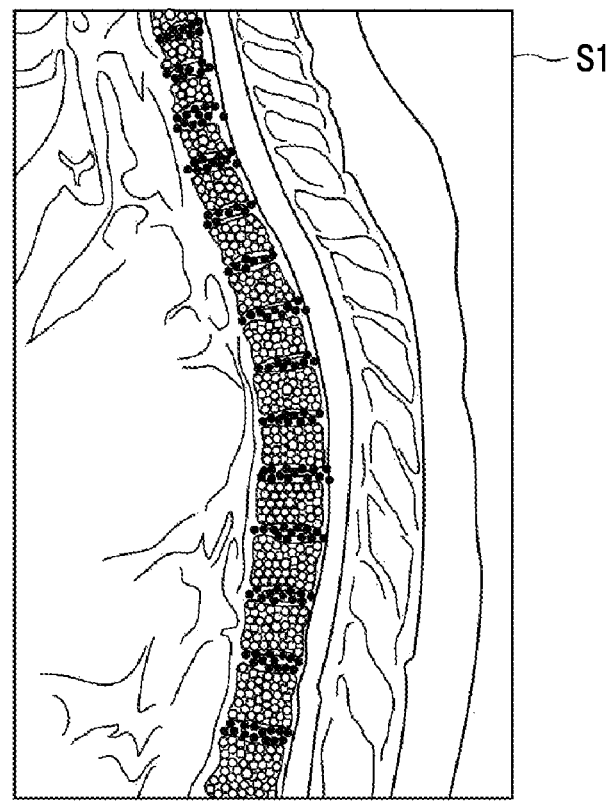
FIG. 6 is a diagram showing a detection result of intervertebral disc candidates and vertebral body candidates.

FIG. 6 is a diagram showing a detection result of intervertebral disc candidates and vertebral body candidates. In FIG. 6, a black circle shows the location of each intervertebral disc candidate, and a white circle indicates the location of each vertebra candidate. As shown in FIG. 6, a plurality of intervertebral disc candidates are detected for one intervertebral disc, and a plurality of vertebral body candidates are detected for one vertebral body.

Figure 7:
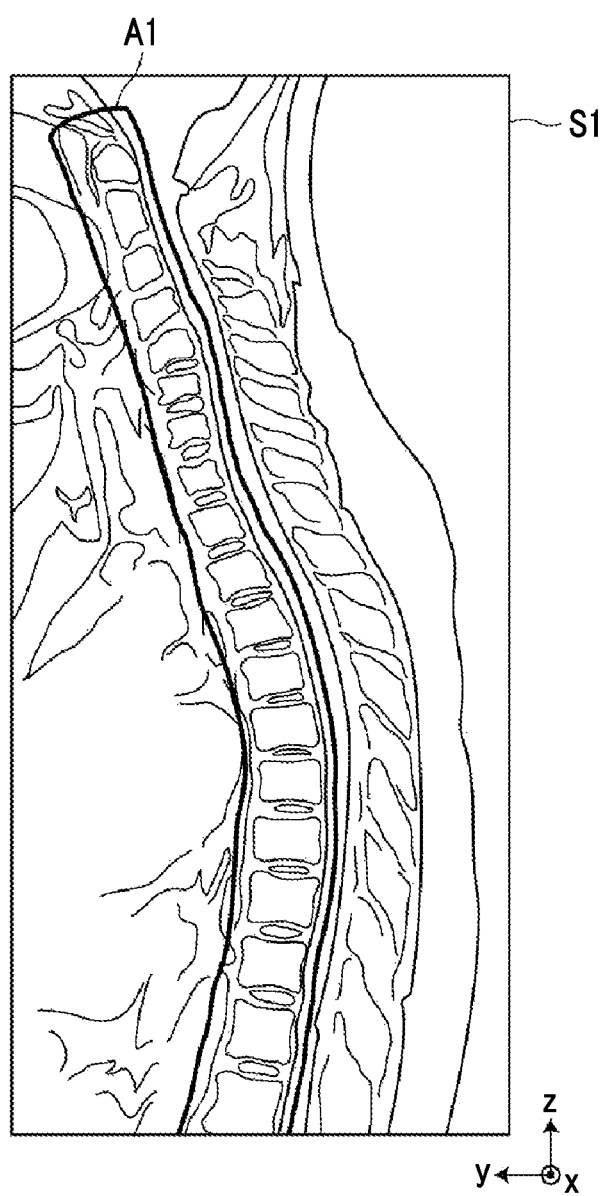
FIG. 7 is a diagram showing a spinal region specified in a medical image.

The candidate detection unit 22 may specify a spinal region where the spine is present in the medical image S1, and detect an intervertebral disc candidate and a vertebral body candidate from the spinal region. In this case, a spinal region may be specified by displaying the medical image S1 on the display 14 and receiving the input of the spinal region using the input unit 15 in the displayed medical image S1. For example, a spinal region may be specified using the method disclosed in JP2014-121598A. In the method disclosed in JP2014-121598A, an average image at the corresponding positions of a medical image including the spine in a sagittal section and a medical image not including the spine is generated. Then, the average image is subtracted from each medical image. In the image obtained by subtraction, a spine portion shows a high signal value. For this reason, the image obtained by subtraction is binarized, and a region where the signal value is larger than a threshold value is specified as a spinal region. Therefore, as shown in FIG. 7, a spinal region A1 can be specified in the medical image S1. In order to specify the spinal region, a sagittal sectional image that does not include the spine is required. Accordingly, the image acquisition unit 21 can also acquire a medical image that does not include the spine.

Thus, the amount of calculation in detecting intervertebral disc candidates and vertebral body candidates can be reduced by specifying a spinal region in the medical image and detecting intervertebral disc candidates and vertebral body candidates in the spinal region.

The centerline detection unit 23 detects at least either a spine centerline or a spinal cord centerline from the medical image S1. In the present embodiment, the spine centerline is detected using the position information of the intervertebral disc candidates and the vertebral body candidates detected by the candidate detection unit 22. Here, the position information of the intervertebral disc candidates are distributed with the centers of the intervertebral discs as references on the medical image S1. In addition, the position information of the vertebral body candidates are distributed with the centers of the vertebral bodies as references on the medical image S1. The center of an intervertebral disc and the center of a vertebral body are located on the spine centerline.

Figure 8:
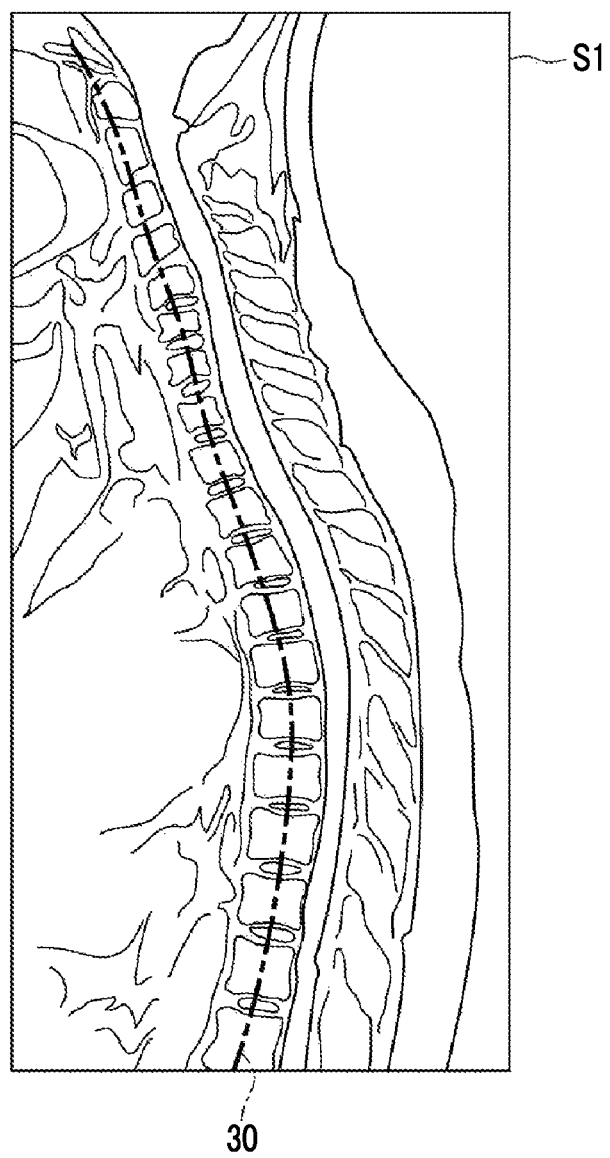
FIG. 8 is a diagram for explaining the detection of a spine centerline.

Accordingly, the centerline detection unit 23 calculates a spine centerline by plotting the position information of the intervertebral disc candidate and the vertebral body candidate on the medical image S1 and applying a method of fitting a polygonal line or a curve, such as a polynomial curve or a B-Spline curve, for the plot, for example, as disclosed in JP2009-207727A. In addition, it is also possible to use a RANSAC method (for example, M. A. Fischler and R. C. Bolles (June 1981). "Random Sample Consensus: A Paradigm for Model Fitting with Applications to Image Analysis and Automated Cartography". Comm. of the ACM 24: 381-395) of extracting some samples from a plot at random and applying a least squares method. Therefore, as shown in FIG. 8, a spine centerline 30 is detected in the medical image S1.

When detecting the spinal cord centerline, it is possible to use a method disclosed in JP2011-142960A, for example. The method disclosed in JP2011-142960A is a method of detecting the spinal cord centerline by generating a plurality of sectional images of axial sections perpendicular to the body axis from a plurality of medical images, detecting the sectional shapes of the spinal cord from the plurality of sectional images, and interpolating the positions of the plurality of detected sectional shapes. As the method of detecting the spine centerline or the spinal cord centerline, it is possible to use any method, such as a method disclosed in JP2009-207886A, without being limited to the method described above.

Figure 9:
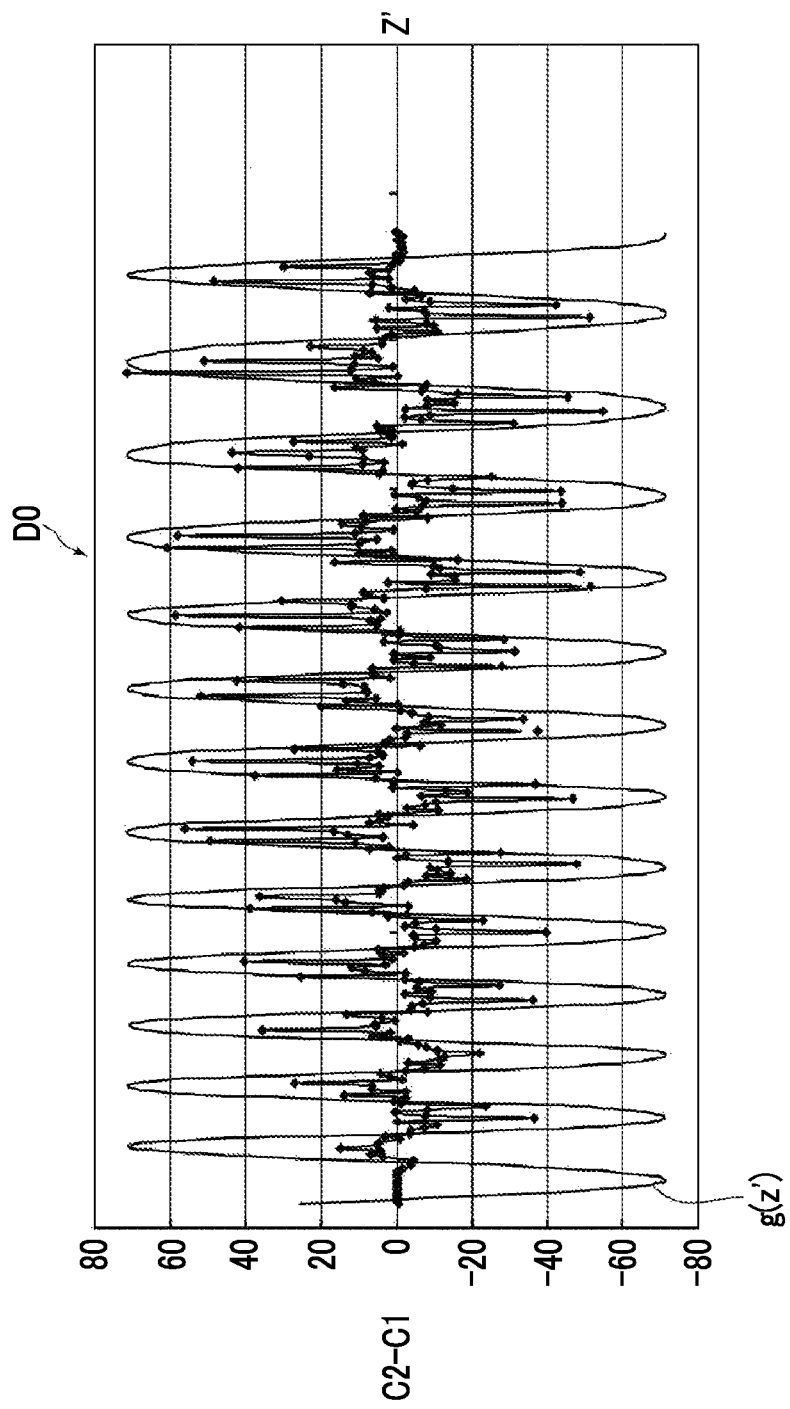
FIG. 9 is a diagram showing the distribution of a feature amount indicating the intervertebral disc likeness and a feature amount indicating the vertebral body likeness.

The distribution generation unit 24 generates the distribution of the feature amount C1 indicating the intervertebral disc likeness and the feature amount C2 indicating the vertebral body likeness by cumulatively adding the feature amount C1 indicating the intervertebral disc likeness and the feature amount C2 indicating the vertebral body likeness, for each of the intervertebral disc candidates and the vertebral body candidates distributed as shown in FIG. 6, on the spine centerline. In this case, the sign of the feature amount C1 indicating the intervertebral disc likeness or the feature amount C2 indicating the vertebral body likeness is inverted to a negative value when performing the cumulative addition. In the present embodiment, the sign of the feature amount C1 indicating the intervertebral disc likeness is inverted to a negative value, and the feature amounts C1 and C2 are cumulatively added on the spine centerline. Therefore, the distribution generation unit 24 converts the xyz coordinate system of the medical image S1 into an x'y'z' coordinate system having the spine centerline 30 as its z' axis. Then, the feature amount C2 is cumulatively added at the position of the vertebral body candidate on the z' axis of the converted x'y'z' coordinate system, and the feature amount C1 obtained by inverting the sign is cumulatively added at the position of the intervertebral disc candidate. FIG. 9 is a diagram showing the distribution D0 of the feature amount C1 indicating the intervertebral disc likeness and the feature amount C2 indicating the vertebral body likeness. In FIG. 9, the horizontal axis indicates a z' axis, and the vertical axis indicates a feature amount. As shown in FIG. 9, the distribution D0 has a plurality of positive peaks and a plurality of negative peaks. In the present embodiment, since the feature amount C2 indicating the vertebral body likeness is positive and the feature amount C1 indicating the intervertebral disc likeness is negative, the position of a positive peak corresponds to the z' coordinate of the center of a vertebral body and the position of a negative peak corresponds to the z' coordinate of the center of an intervertebral disc.

The specification unit 25 specifies intervertebral discs and vertebral bodies included in the medical image S1 based on the distribution D0. For the above, the specification unit 25 specifies the positions of intervertebral discs and vertebral bodies by adapting the distribution D0 to a predetermined fitness function (a periodic function or a quasi-periodic function). Here, the "periodic function" refers to a function that has periodicity for the position of the z' coordinate and that has a constant period regardless of the position of the z' coordinate. In addition, the "quasi-periodic function" refers to a function that has periodicity for the position of the z' coordinate and that has a period modulated according to the position of the z' coordinate.

As a fitness function, a periodic function, such as a trigonometric function, may be used. However, the vertebral body has a structural feature that the height in the z'-axis direction gradually increases toward the lumbar from the cervical vertebra. For this reason, in the present embodiment, a quasi-periodic function g(z') shown in the following Equation (1) is used as a fitness function. The fitness function is stored in the storage device 13.

$$g(z') = \cos\frac{2\pi(z'-c)}{az'+b} \quad (1)$$

In Equation (1), a, b, and c are constants for determining the shape of g(z'). When a=0, g(z') is a periodic function. The definition of the value of g(z') is the same as the definition of the value of the distribution D0. That is, a maximum value at the center of a vertebral body is adopted, and a minimum value at the center of an intervertebral disc is adopted.

Then, the specification unit 25 adapts the distribution D0 globally. Here, "adapt globally" refers to "adapt in the possible entire range of the position z' on the z' axis". The specification unit 25 can determine the optimal constants a, b, and c by performing multi-variable analysis, such as a least squares method. For example, the evaluation value H of the fitting is expressed by the following Equation (2). f(z') is the feature amounts C1 and C2 in the distribution D0.

$$H(a,b,c) = \sum_{z'=1}^{z'} f(z')\cos\frac{2\pi(z'-c)}{az'+b} \quad (2)$$

The constants a, b, and c that maximize the evaluation value H are selected. In this case, a possible range of the constants a, b, and c is set in advance, and a search is performed using all combinations of a, b, and c in the range. In this manner, the distribution D0 generated by the distribution generation unit 24 can be adapted to the fitness function shown in Equation (1). FIG. 9 shows a fitness function g(z') to which the distribution D0 is adapted. The distribution D0 and the fitness function g(z') may be displayed on the display 14.

The specification unit 25 specifies the position of a vertebral body and the position of an intervertebral disc based on the adapted fitness function. For example, in the example of the fitness function shown in Equation (1), assuming that g(z')=cos(t) and n is an integer, positive peaks appear at t=0, 2π, 4π, ..., 2nπ and negative peaks appear at t=π, 3π, 5π, ..., 2(n+1)π in cos(t). In the present embodiment, a positive peak is the position of a vertebral body, and a negative peak is the position of an intervertebral disc. Therefore, the position z'(n) of the n-th vertebral body can be calculated by the following Equation (3). In addition, the position z'(n) of the n-th intervertebral disc can be calculated by the following Equation (4).

$$\frac{2\pi(z'-c)}{az'+b} = 2n\pi \quad (3)$$
$$\rightarrow z'(n) = \frac{c+nb}{1-na}$$

$$\frac{2\pi(z'-c)}{az'+b} = 2(n+1)\pi \quad (4)$$
$$\rightarrow z'(n) = \frac{2c+(2n+1)b}{2-(2n+1)a}$$

Figure 10:
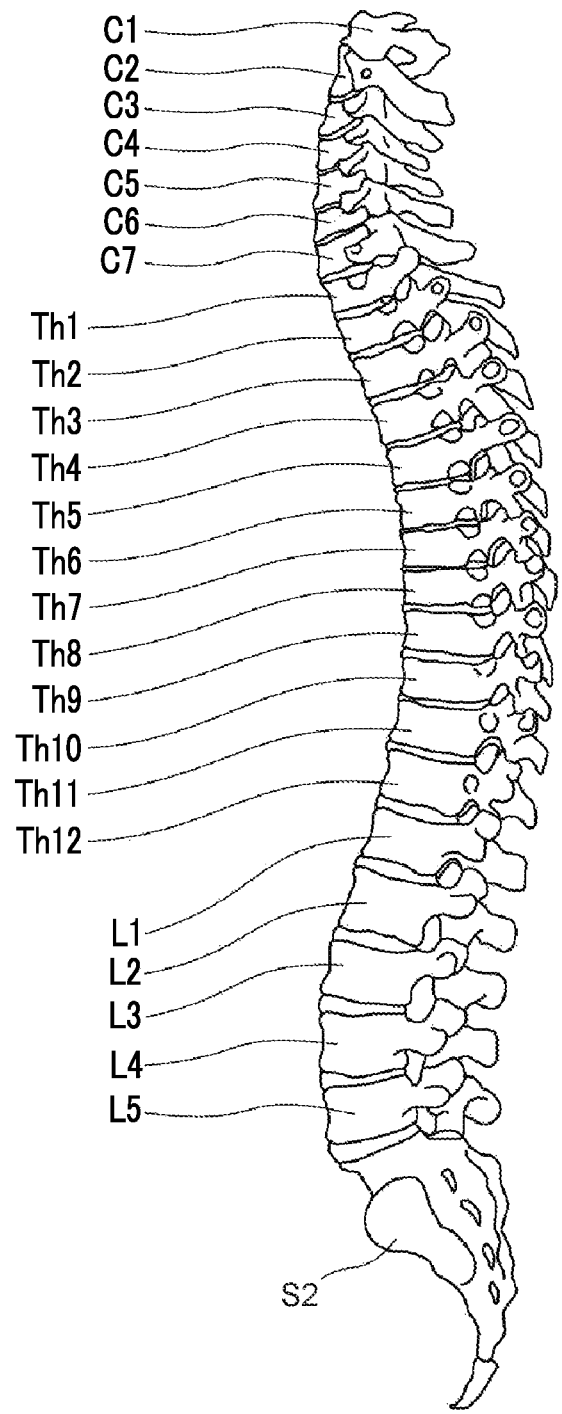
FIG. 10 is a diagram schematically showing a sagittal image that shows the arrangement of vertebrae.

The labeling unit 26 labels a vertebra including a vertebral body specified by the specification unit 25. In the present embodiment, the anatomical type of the vertebra is used as a label. FIG. 10 is a diagram schematically showing a sagittal image that shows the arrangement of vertebrae. As shown in FIG. 10, a number is anatomically given to each vertebra. Here, the spine is configured to include four parts of a cervical vertebra, a thoracic vertebra, a lumbar, and a sacrum. The cervical vertebra includes first to seventh cervical vertebrae, and identification information of C1 to C7 is given anatomically. The thoracic vertebra includes first to twelfth thoracic vertebrae, and identification information of Th1 to Th12 is given anatomically. The lumbar includes first to fifth lumbar vertebrae, and identification information of L1 to L5 is given anatomically. The sacrum includes only one bone, and identification information of S2 is given anatomically. The labeling unit 26 gives such identification information, as a label, to each vertebra including the vertebral body specified by the specification unit 25.

When only the thoracic vertebrae are included in the medical image S1, it may be difficult to give anatomical identification information. In such a case, the labeling unit 26 may give sequential numbers to the vertebrae included in the medical image S1 in order from the top or the bottom of the medical image S1. In this case, if the anatomical identification information of any of the vertebrae included in the medical image S1 is known, anatomical identification information of other vertebrae can be specified based on the sequential numbers.

Figure 11:
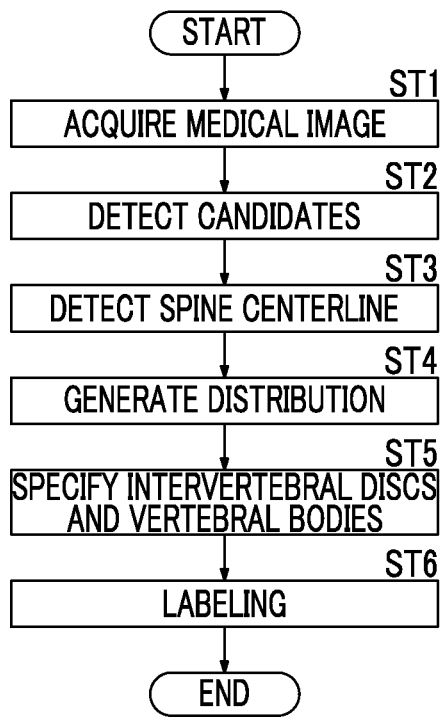
FIG. 11 is a flowchart showing the process performed in the first embodiment.

Next, the process performed in the first embodiment will be described. FIG. 11 is a flowchart showing the process performed in the first embodiment. First, the image acquisition unit 21 acquires one medical image S1 to be diagnosed (step ST1), and the candidate detection unit 22 detects an intervertebral disc candidate and a vertebral body candidate by calculating the feature amount C1 indicating the intervertebral disc likeness and the feature amount C2 indicating the vertebral body likeness in the medical image S1 (candidate detection: step ST2). Then, the centerline detection unit 23 detects the spine centerline 30 (step ST3), and the distribution generation unit 24 generates the distribution of the feature amount C1 indicating the intervertebral disc likeness and the feature amount C2 indicating the vertebral body likeness (step ST4). Then, the specification unit 25 specifies intervertebral discs and vertebral bodies included in the medical image S1 based on the distribution D0 (step ST5). Then, the labeling unit 26 labels the vertebra including the specified vertebral body (step ST6), and the process is ended.

Thus, in the first embodiment, intervertebral disc candidates and vertebral body candidates are detected from the medical image S1 including intervertebral discs and vertebral bodies, and intervertebral discs and vertebral bodies included in the medical image S1 are specified using the intervertebral disc candidate and the vertebral body candidate. Accordingly, even if parts of intervertebral discs and vertebral bodies are deformed, it is possible to accurately specify the intervertebral discs and the vertebral bodies by using both the intervertebral disc candidates and the vertebral body candidates.

Next, a second embodiment of the invention will be described. In the first embodiment described above, intervertebral discs and vertebral bodies are specified using one medical image S1. However, the second embodiment is different from the first embodiment in that intervertebral discs and vertebral bodies are specified using a plurality of medical images. In addition, in the second embodiment, it is assumed that each of the plurality of medical images used to specify the intervertebral disc and the vertebral body includes a spine.

Figure 12:
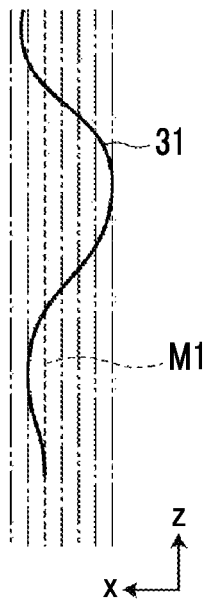
FIG. 12 is a diagram showing a state in which an intervertebral disc and a vertebral body cannot be specified.

When the spine is curved in the left and right direction of the human body, that is, in the x-axis direction due to spinal curvature disorders or the like, it may not be possible to specify the intervertebral disc and the vertebral body if only one medical image is used. FIG. 12 is a diagram showing a state in which intervertebral discs and vertebral bodies cannot be specified. In FIG. 12, the left and right direction of the paper is the x-axis direction, and the spine is shown by a heavy line for the sake of explanation. When a spine 31 is curved in the x-axis direction as shown in FIG. 12, a spine included in a medical image in one sagittal section M1 is a part of the entire spine. For this reason, if only a medical image in one sagittal section M1 is used, it is not possible to specify all intervertebral discs and all vertebral bodies.

Therefore, in the second embodiment, as shown in virtual lines in FIG. 12, intervertebral discs and vertebral bodies are specified using a plurality of medical images in a plurality of sagittal sections.

Figure 13:
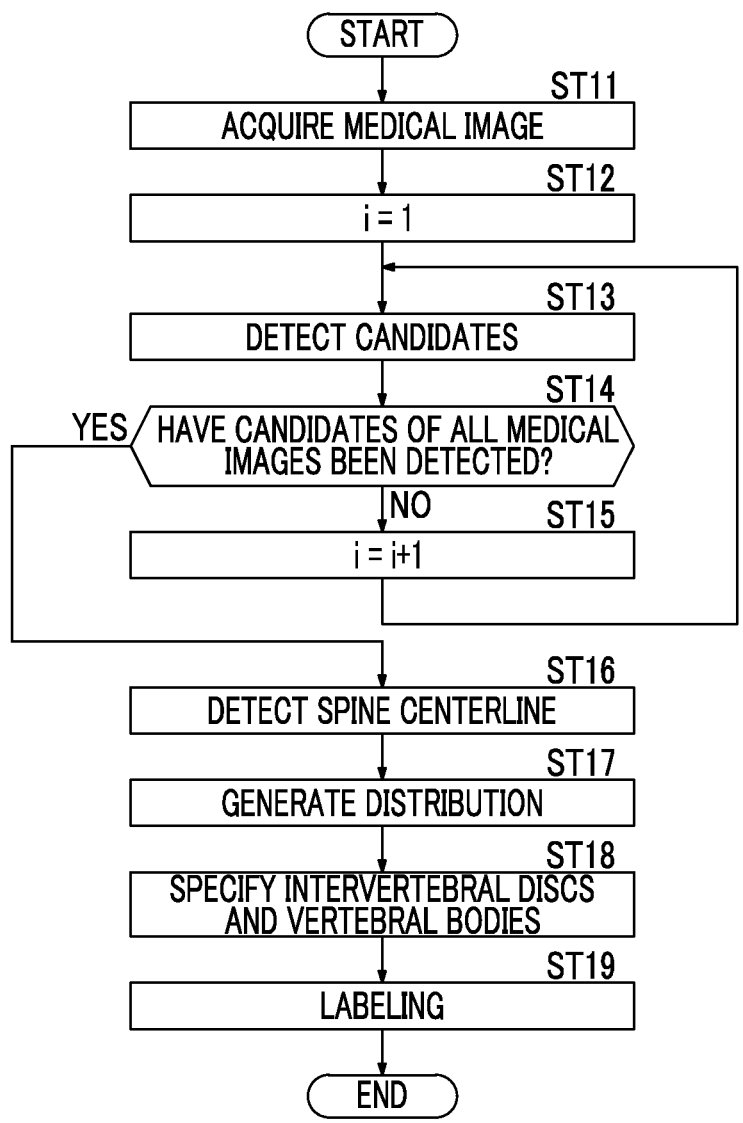
FIG. 13 is a flowchart showing the process performed in a second embodiment.

Next, the process performed in the second embodiment will be described. FIG. 13 is a flowchart showing the process performed in the second embodiment. First, the image acquisition unit 21 acquires a plurality (m) of medical images Si (i=1 to m) to be diagnosed (step ST11), and the candidate detection unit 22 sets a first medical image S1 as a target to be processed (i=1: step ST12), and detects an intervertebral disc candidate and a vertebral body candidate by calculating the feature amount C1 indicating the intervertebral disc likeness and the feature amount C2 indicating the vertebral body likeness in the medical image S1 (candidate detection: step ST13). Then, the candidate detection unit 22 determines whether or not intervertebral disc candidates and vertebral body candidates of all medical images have been detected (step ST14). When the determination result in step ST14 is negative, the candidate detection unit 22 sets a candidate detection target to the next medical image (i=i+1: step ST15), and the process returns to step ST13.

When the determination result in step ST14 is positive, the centerline detection unit 23 detects the spine centerline 30 (step ST16). In this case, as position information for the centerline detection, the position information of intervertebral disc candidates and vertebral body candidates detected for all of the medical images is used. Here, when the spine is curved in the x-axis direction as shown in FIG. 12, the spine centerline is also curved in the x-axis direction.

Then, the distribution generation unit 24 generates the distribution of the feature amount Cl indicating the intervertebral disc likeness and the feature amount C2 indicating the vertebral body likeness by cumulatively adding the feature amount C1 indicating the intervertebral disc likeness and the feature amount C2 indicating the vertebral body likeness, which have been detected for all of the medical images, on the spine centerline (step ST17). Then, the specification unit 25 specifies intervertebral discs and vertebral bodies in a plurality of medical images based on the distribution D0 (step ST18). Then, the labeling unit 26 labels the vertebra including the specified vertebral body (step ST19), and the process is ended.

Thus, in the second embodiment, intervertebral disc candidates and vertebral body candidates are detected from the medical images of a plurality of sagittal sections, and intervertebral discs and vertebral bodies included in the medical images are specified using the intervertebral disc candidates and the vertebral body candidates that have been detected from the plurality of medical images. Therefore, even if the spine is curved in the x-axis direction, it is possible to accurately detect intervertebral disc candidates and vertebral body candidates without omission. As a result, it is possible to accurately specify intervertebral discs and vertebral bodies.

Next, a third embodiment of the invention will be described. In the first embodiment described above, the centerline detection processing, the distribution generation processing, and the specification processing are performed using all of the intervertebral disc candidates and the vertebral body candidates detected by the candidate detection unit 22. The third embodiment is different from the first embodiment in that the centerline detection processing, the distribution generation processing, and the specification processing are performed after removing isolated candidates from all of the intervertebral disc candidates and the vertebral body candidates detected by the candidate detection unit 22.

Figure 14:
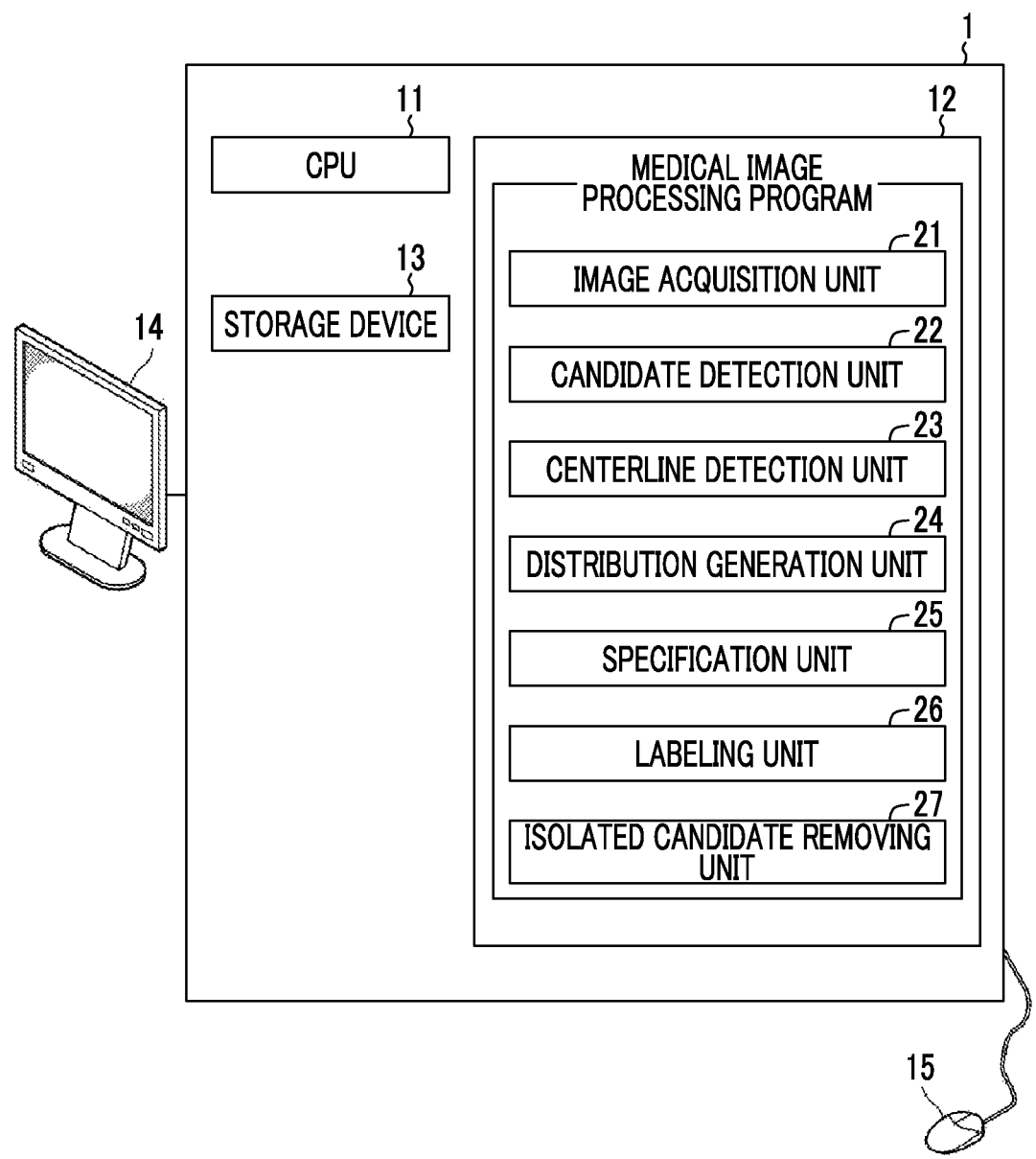
FIG. 14 is a diagram showing the schematic configuration of a medical image processing apparatus according to a third embodiment.

FIG. 14 is a diagram showing the schematic configuration of a medical image processing apparatus according to the third embodiment. In FIG. 14, the same components as in FIG. 2 are denoted by the same reference numbers, and the detailed explanation thereof will be omitted. The medical image processing apparatus according to the third embodiment includes an isolated candidate removing unit 27, which is a difference from the first embodiment.

Figure 15:
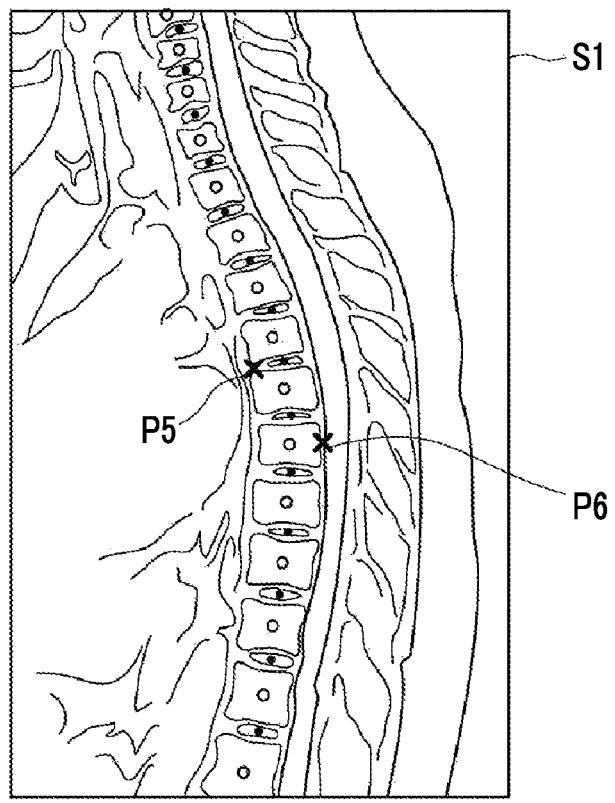
FIG. 15 is a diagram for explaining the removal of an isolated candidate.

FIG. 15 is a diagram for explaining the removal of an isolated candidate. When the position of an intervertebral disc candidate matches the position of an intervertebral disc, the center-of-gravity position of each of a plurality of the position information of intervertebral disc candidates is the position of each intervertebral disc, that is, the position of a black circle shown in FIG. 15. In addition, when the position of a vertebral body candidate matches the position of a vertebral body, the center-of-gravity position of each of a plurality of vertebral body candidates is the position of each vertebral body, that is, the position of a white circle shown in FIG. 15. However, when the positions of an intervertebral disc candidate and a vertebral body candidate deviate from the spine as shown by points P5 and P6 in FIG. 15, it is not possible to accurately specify the spine centerline and the distribution due to the influence of the position information of the intervertebral disc candidate and the vertebral body candidate that are located at the deviated positions. If the spine centerline and the distribution cannot be accurately detected as described above, it is not possible to accurately specify the intervertebral disc and the vertebral body.

For this reason, in the third embodiment, the centerline detection processing, the distribution generation processing, and the specification processing are performed after the isolated candidate removing unit 27 removes isolated candidates, which cannot be regarded as intervertebral discs and vertebral bodies due to being different from actual intervertebral discs and vertebrae even though the isolated candidates have been detected as intervertebral discs and vertebral bodies, such as the points P5 and P6 in FIG. 15. Therefore, first, for the intervertebral disc candidates, the isolated candidate removing unit 27 selects a plurality of intervertebral disc candidates in a predetermined range having each intervertebral disc candidate detected by the candidate detection unit 22 at its center. As a predetermined range, about the size of one vertebral body is preferable. Then, a feature amount indicating the intervertebral disc likeness is added for a plurality of intervertebral disc candidates included in the predetermined range. Then, the sum value is compared with a predetermined threshold value Th3, and an intervertebral disc candidate having a sum value smaller than the threshold value Th3 is regarded as an isolated candidate and the intervertebral disc candidate is removed. Similarly for the vertebral body candidates, a plurality of vertebral body candidates are selected in a predetermined range having each vertebral body candidate detected by the candidate detection unit 22 at its center. Then, a feature amount indicating the vertebral body likeness is added for a plurality of vertebral body candidates included in the predetermined range. Then, the sum value is compared with a predetermined threshold value Th4, and a vertebral body candidate having a sum value smaller than the threshold value Th4 is regarded as an isolated candidate and the vertebral body candidate is removed.

Figure 16:
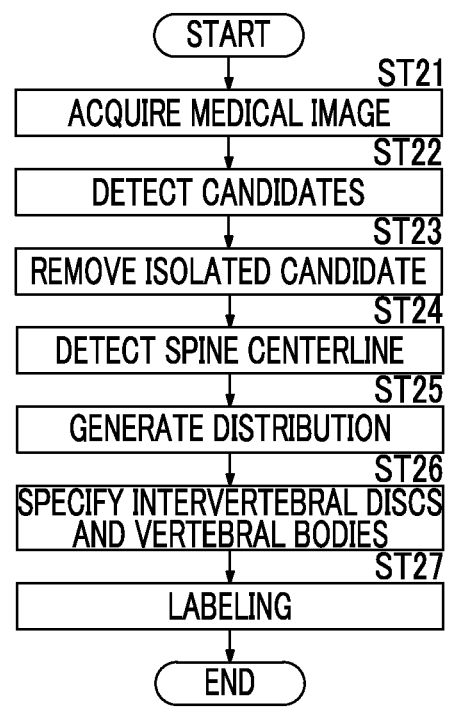
FIG. 16 is a flowchart showing the process performed in the third embodiment.

Next, the process performed in the third embodiment will be described. FIG. 16 is a flowchart showing the process performed in the third embodiment. First, the image acquisition unit 21 acquires one medical image S1 to be diagnosed (step ST21), and the candidate detection unit 22 detects intervertebral disc candidates and vertebral body candidates by calculating the feature amount C1 indicating the intervertebral disc likeness and the feature amount C2 indicating the vertebral body likeness in the medical image S1 (candidate detection: step ST22). Then, the isolated candidate removing unit 27 removes an isolated candidate from the intervertebral disc candidates and the vertebral body candidates (step ST23). Then, the centerline detection unit 23 detects the spine centerline 30 (step ST24), and the distribution generation unit 24 generates the distribution of the feature amount C1 indicating the intervertebral disc likeness and the feature amount C2 indicating the vertebral body likeness on the spine centerline (step ST25). Then, the specification unit 25 specifies intervertebral discs and vertebral bodies included in the medical image S1 based on the distribution DO (step ST26). Then, the labeling unit 26 labels the vertebra including the specified vertebral body (step ST27), and the process is ended.

Thus, in the third embodiment, an isolated candidate is removed from the intervertebral disc candidates and the vertebral body candidates. Therefore, since the influence of the isolated candidate is eliminated, it is possible to accurately specify the intervertebral disc and the vertebral body.

In the third embodiment described above, an isolated candidate is removed in the first embodiment. However, it is also possible to remove an isolated candidate in the second embodiment. In this case, it is preferable to remove an isolated candidate in each of the plurality of medical images.

Figure 17:
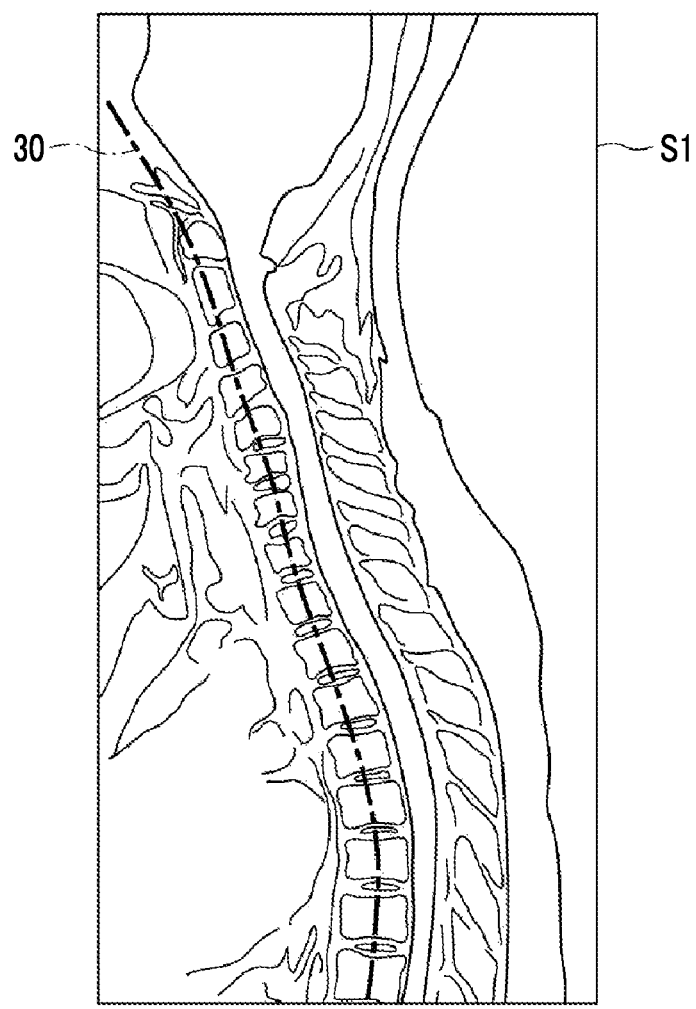
FIG. 17 is a diagram showing a medical image including an upper spine end.
Figure 18:
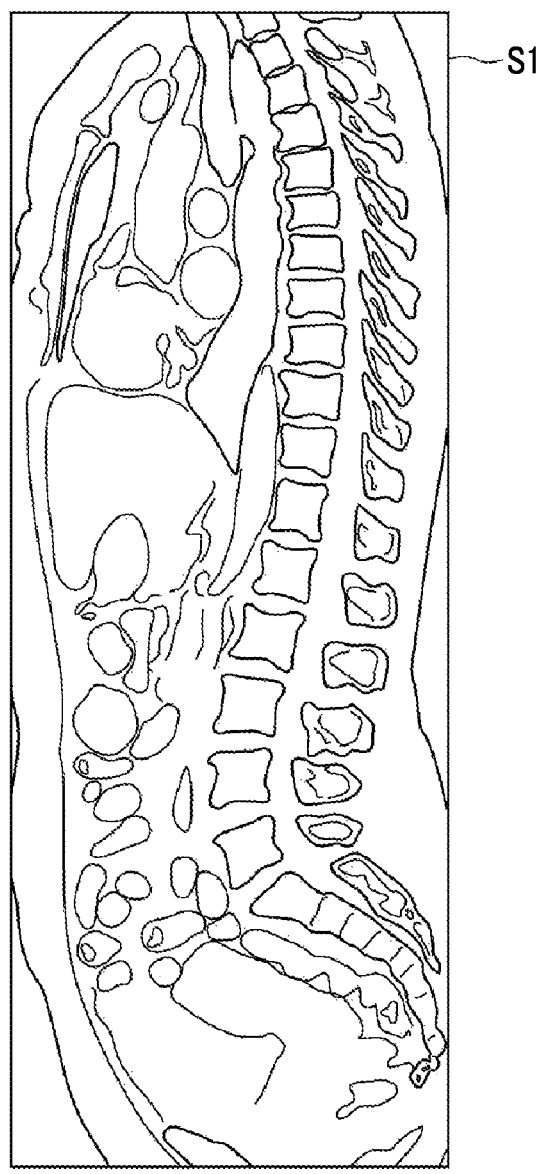
FIG. 18 is a diagram showing a medical image including a lower spine end.

Incidentally, when an intervertebral disc candidate and a vertebral body candidate are erroneously detected, a centerline detected by the centerline detection unit 23 may extend beyond the upper end of the original spine, as shown in FIG. 17. In addition, although not shown, a centerline that extends beyond the lower end of the spine may be detected. Here, a portion of the vertebral body included in the vertebra has a cylindrical shape. However, as shown in FIG. 17, the first and second cervical vertebrae located at the upper end of the spine have different characteristic shapes from the other vertebrae. In addition, as shown in FIG. 18, the fifth lumbar and the sacrum located at the lower end of the spine also have different characteristic shapes from the other vertebrae. Therefore, the candidate detection unit 22 may detect at least either the vertebrae at the upper end of the spine or the vertebrae at the lower end of the spine as an upper spine end candidate and a lower spine end candidate. Hereinafter, this will be described as a fourth embodiment. In addition, at least one of the first and second cervical vertebrae is used as a vertebra at the upper end of the spine, and at least one of the fifth lumbar and the sacrum is used as a vertebrae at the lower end of the spine.

In the fourth embodiment, the candidate detection unit 22 includes a discriminator for upper spine end candidates and lower spine end candidates. The discriminator for upper spine end candidates and lower spine end candidates is acquired by performing machine learning with the vertebrae at the upper end of the spine and the vertebrae at the lower end of the spine as positive teacher images. The candidate detection unit 22 of the fourth embodiment detects upper spine end candidates and lower spine end candidates in addition to intervertebral disc candidates and vertebral body candidates. Then, when an upper spine end candidate and a lower spine end candidate have been detected, the centerline detection unit 23 detects a spine centerline so that the vertebra located at the upper end of the spine and the vertebra located at the lower end of the spine become ends using the upper spine end candidate, the lower spine end candidate, the intervertebral disc candidate, and the vertebral body candidate. In this manner, since the upper and lower ends of the spine centerline or the spinal cord centerline can be specified, intervertebral discs and vertebral bodies are no longer specified over a length exceeding the length of the spine that is actually present. Therefore, it is possible to accurately specify the intervertebral disc and the vertebral body.

Depending on a medical image to be processed, both of the vertebra located at the upper end of the spine and the vertebra located at the lower end of the spine may not be included. In this case, only an upper spine end candidate may be detected when only the vertebra located at the upper end is included, and only a lower spine end candidate may be detected when only the vertebra located at the lower end is included.

In the fourth embodiment described above, upper spine end candidates and lower spine end candidates are detected in the first embodiment. However, upper spine end candidates and lower spine end candidates may be detected in the second and third embodiments. When detecting upper spine end candidates and lower spine end candidates in the second embodiment, upper spine end candidates and lower spine end candidates may be detected from each of a plurality of medical images.

Figure 19:
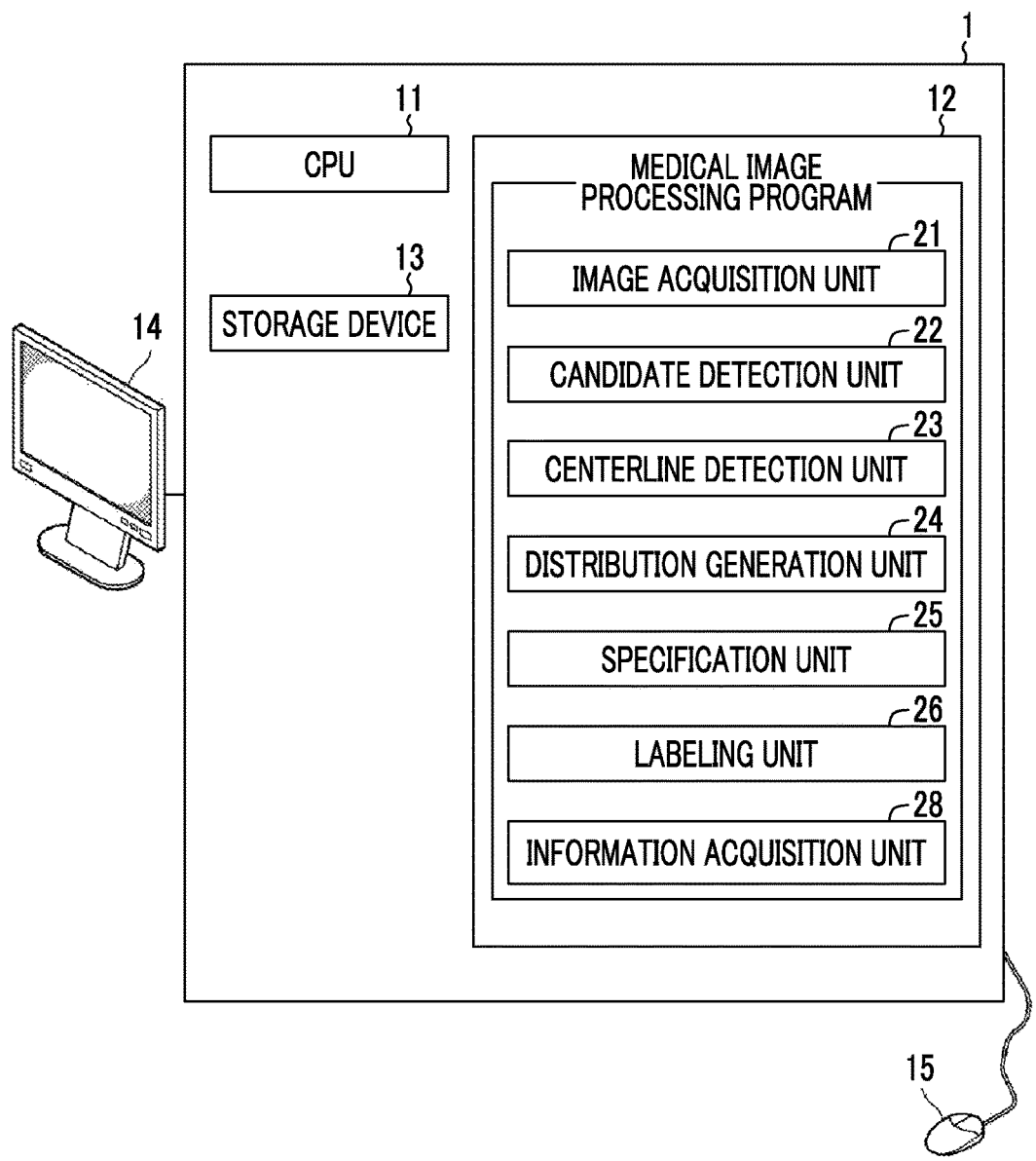
FIG. 19 is a diagram showing the schematic configuration of a medical image processing apparatus according to a fifth embodiment.

Next, a fifth embodiment of the invention will be described. FIG. 19 is a diagram showing the schematic configuration of a medical image processing apparatus according to the fifth embodiment. In FIG. 19, the same components as in FIG. 2 are denoted by the same reference numbers, and the detailed explanation thereof will be omitted. The medical image processing apparatus according to the fifth embodiment is different from the medical image processing apparatus according to the first embodiment in that an information acquisition unit 28 is provided.

In the first embodiment described above, as shown in FIG. 15, it is possible to acquire the position information of intervertebral disc candidates and vertebral body candidates. The information acquisition unit 28 further acquires additional information regarding the intervertebral disc and the vertebral body from the position information. Specifically, at least one of the direction of the central axis when approximating the vertebral body in a cylindrical shape, the length along the central axis, and the length in a direction perpendicular to the central axis is generated. The length in a direction perpendicular to the central axis means a length on a sagittal section.

Figure 20:
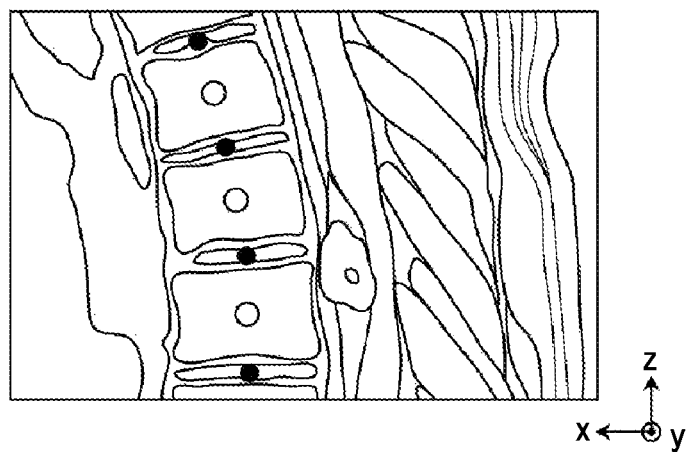
FIG. 20 is a diagram for explaining the generation of additional information.
Figure 21:
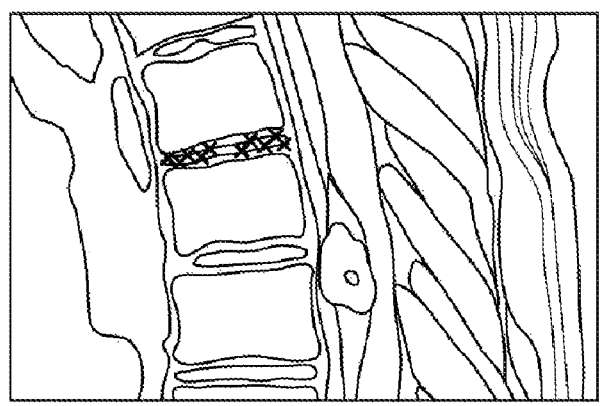
FIG. 21 is a diagram for explaining the generation of additional information.

FIGS. 20 and 21 are diagrams for explaining the generation of additional information. As in FIG. 15, the center-of-gravity positions of a plurality of intervertebral disc candidates are positions of black circles shown in FIG. 20. In addition, the center-of-gravity positions of vertebral body candidates are positions of white circles. Focusing on a certain vertebral body in FIG. 20, the information acquisition unit 28 can acquire the information of the direction of the central axis when approximating the vertebral body in a cylindrical shape by defining the straight line connecting the center-of-gravity positions of intervertebral disc candidates detected above and below the vertebral body to each other. In addition, the information of the length along the central axis when approximating the vertebral body in a cylindrical shape can be acquired by the length of the straight line.

On the other hand, the position information of intervertebral disc candidates detected near a certain intervertebral disc is distributed in the width direction of the intervertebral disc as shown in FIG. 21. In FIG. 21, the position information is shown by "x". Therefore, the positions of both ends of the distribution of the position information of the intervertebral disc candidates indicate the positions of both ends of the intervertebral disc. In addition, the positions of both ends of the intervertebral disc indicate a length in a direction perpendicular to the central axis of the vertebral body. Accordingly, the information acquisition unit 28 detects the positions of both ends of the distribution of the position information of intervertebral disc candidates located above or below a certain vertebral body. In addition, the information of the length in a direction perpendicular to the central axis when approximating the vertebral body in a cylindrical shape can be acquired by the length of the straight line connecting the positions of both ends to each other.

Thus, in the fifth embodiment, by extracting additional information regarding at least either the specified intervertebral disc or the specified vertebral body, it is possible to obtain the anatomical information regarding at least either the intervertebral disc or the vertebral body.

In the fifth embodiment, at least one of the direction of the central axis when approximating the vertebral body in a cylindrical shape, the length along the central axis, and the length in a direction perpendicular to the central axis is generated as additional information. However, any information may be generated as additional information as long as the information is information regarding the vertebral body and the intervertebral disc without being limited to the above.

In each of the embodiments described above, both the intervertebral disc and the vertebral body are specified. However, only one of the intervertebral disc and the vertebral body may be specified.

In each of the embodiments described above, an intervertebral disc candidate and a vertebral body candidate are detected using a discriminator acquired by machine learning. However, it is also possible to use other methods other than the method using a discriminator, such as template matching using a template of an intervertebral disc and a template of a vertebral body.

In each of the embodiments described above, an MRI image of the sagittal section is used as a medical image. However, a CT image of the sagittal section may also be used as a medical image. In addition, at least either the intervertebral disc or the vertebral body may be specified using a three-dimensional medical image acquired by a CT apparatus or an MRI apparatus.

In each of the embodiments described above, the labeling unit 26 labels the vertebra including the specified vertebral body. However, only the position information of the specified intervertebral disc and vertebral body may be stored in the storage device 13. In this case, the position information of the specified intervertebral disc may be the center-of-gravity position of the position information of the intervertebral disc candidate, and the position information of the specified vertebral body may be the center-of-gravity position of the position information of the vertebral body candidate.

Hereinafter, the effect of the invention will be described.

Intervertebral disc candidates and vertebral body candidates may be detected by calculating a feature amount indicating the intervertebral disc likeness and a feature amount indicating the vertebral body likeness in a medical image. In this case, it is possible to detect an intervertebral disc candidate and a vertebral body candidate using a discriminator obtained by learning intervertebral discs and vertebral bodies. Therefore, it is possible to detect intervertebral disc candidates and vertebral body candidates more accurately.

In addition, the distribution of the feature amount indicating the intervertebral disc likeness and the feature amount indicating the vertebral body likeness may be generated by cumulatively adding the feature amount indicating the intervertebral disc likeness and the feature amount indicating the vertebral body likeness on at least one of the spine centerline and the spinal cord centerline with the sign of the feature amount indicating the intervertebral disc likeness or the feature amount indicating the vertebral body likeness being inverted. Here, the distribution of vertebral bodies and intervertebral discs along the spine is periodic as defined in advance. For this reason, peaks in the distribution of the feature amount indicating the intervertebral disc likeness and the feature amount indicating the vertebral body likeness correspond to the positions of intervertebral discs and the positions of vertebral bodies. Therefore, it is possible to accurately specify at least either the intervertebral disc or the vertebral body using the distribution of the feature amount indicating the intervertebral disc likeness and the feature amount indicating the vertebral body likeness.

In addition, by adapting the above-described distribution to a periodic function or a quasi-periodic function set in advance and specifying at least either the intervertebral disc or the vertebral body included in a medical image based on the adapted periodic function or quasi-periodic function, it is possible to accurately specify at least either intervertebral discs or vertebral bodies based on the period of intervertebral discs and vertebral bodies.

In addition, by labeling the vertebra including the specified vertebral body, it is possible to accurately recognize the position of the vertebra.

In addition, by extracting the additional information regarding at least either the specified intervertebral disc or the specified vertebral body, it is possible to obtain the anatomical information regarding at least either the intervertebral disc or the vertebral body.

It is also possible to detect intervertebral disc candidates and vertebral body candidates from a plurality of sagittal sectional images and to specify at least either intervertebral discs or vertebral bodies included in the medical images using the intervertebral disc candidates and the vertebral body candidates that have been detected from the plurality of sagittal sectional images. Therefore, even if the spine is curved in the left and right direction of the human body, it is possible to detect intervertebral disc candidates and vertebral body candidates without omission. As a result, it is possible to accurately specify at least either intervertebral discs or vertebral bodies.

In addition, it is also possible to estimate a spinal region where the spine is present in a medical image and to detect an intervertebral disc candidate and a vertebral body candidate from the spinal region. In this case, since the amount of calculation when detecting the intervertebral disc candidate and the vertebral body candidate can be reduced, it is possible to quickly specify at least either the intervertebral disc or the vertebral body.

In addition, an isolated candidate may be removed from the intervertebral disc candidates and the vertebral body candidates. In this case, since the influence of the isolated candidate is eliminated, it is possible to accurately specify at least either the intervertebral disc or the vertebral body.

In addition, it is also possible to further detect at least either upper spine end candidates or lower spine end candidates and to specify at least either intervertebral discs or vertebral bodies using at least either the upper spine end candidates or the lower spine end candidates, the intervertebral disc candidates, and the vertebral body candidates. In this case, since it is possible to specify at least either the upper spine end or the lower spine end, at least either the intervertebral discs or the vertebral bodies are no longer specified over a length exceeding the length of the spine that is actually present. Therefore, it is possible to accurately specify at least either the intervertebral disc or the vertebral body.

What is claimed is:

1. A medical image processing apparatus having one or more processors, the one or more processors performs as:
    candidate detection unit that detects intervertebral disc candidates and vertebral body candidates from a medical image including intervertebral discs and vertebral bodies;
    specification unit that specifies at least either the intervertebral discs or the vertebral bodies included in the medical image using the intervertebral disc candidates and the vertebral body candidates,
    wherein the specification unit specifies at least either the intervertebral discs or the vertebral bodies included in the medical image based on periodicity of a distribution of the intervertebral disc candidates and the vertebral body candidates,
    centerline detection unit that detects at least one of a spine centerline and a spinal cord centerline from the medical image; and
    distribution generation unit that generates a distribution of a feature amount indicating the intervertebral disc likeness and a feature amount indicating the vertebral body likeness by cumulatively adding the feature amount indicating the intervertebral disc likeness and the feature amount indicating the vertebral body likeness on at least one of the spine centerline and the spinal cord centerline with a sign of the feature amount indicating the intervertebral disc likeness or the feature amount indicating the vertebral body likeness being inverted,
    wherein the specification unit specifies at least either the intervertebral discs or the vertebral bodies included in the medical image based on the distribution of the feature amount indicating the intervertebral disc likeness and the feature amount indicating the vertebral body likeness.

2. The medical image processing apparatus according to claim 1,
    wherein the candidate detection unit detects the intervertebral disc candidates and the vertebral body candidates by calculating a feature amount indicating the intervertebral disc likeness and a feature amount indicating the vertebral body likeness in the medical image.

3. The medical image processing apparatus according to claim 1,
    wherein the specification unit adapts the distribution of the feature amount indicating the intervertebral disc likeness and the feature amount indicating the vertebral body likeness to a periodic function or a quasi-periodic function set in advance in a direction of the spinal cord centerline or the spine centerline, and specifies at least either the intervertebral discs or the vertebral bodies included in the medical image based on the adapted periodic function or the adapted quasi-periodic function.

4. The medical image processing apparatus according to claim 1,
    wherein the centerline detection unit detects at least one of the spine centerline and the spinal cord centerline from the medical image using position information of the intervertebral disc candidates and the vertebral body candidates.

5. The medical image processing apparatus according to claim 1, the processor further performs as:
    labeling unit that labels vertebrae including the specified vertebral bodies.

6. The medical image processing apparatus according to claim 1, the processor further performs as:
    information acquisition unit that acquires additional information regarding at least either the specified intervertebral discs or the specified vertebral bodies.

7. The medical image processing apparatus according to claim 1,
    wherein the medical image is a magnetic resonance imaging image.

8. The medical image processing apparatus according to claim 1,
wherein the medical image is a sagittal sectional image.

9. The medical image processing apparatus according to claim 8,
wherein the candidate detection unit detects the intervertebral disc candidates and the vertebral body candidates from a plurality of sagittal sectional images, and
the specification unit specifies at least either the intervertebral discs or the vertebral bodies included in the medical image using the intervertebral disc candidates and the vertebral body candidates detected from the plurality of sagittal sectional images.

10. The medical image processing apparatus according to claim 1,
wherein the candidate detection unit estimates a spinal region where a spine is present in the medical image, and detects the intervertebral disc candidates and the vertebral body candidates from the spinal region.

11. The medical image processing apparatus according to claim 1, the processor further performs as:
isolated candidate removing unit that removes an isolated candidate from the intervertebral disc candidates and the vertebral body candidates.

12. The medical image processing apparatus according to claim 1,
wherein the candidate detection unit further detects at least either upper spine end candidates or lower spine end candidates, and
the specification unit specifies at least either the intervertebral discs or the vertebral bodies using at least either the upper spine end candidates or the lower spine end candidates, the intervertebral disc candidates, and the vertebral body candidates.

13. A medical image processing method comprising:
detecting intervertebral disc candidates and vertebral body candidates from a medical image including intervertebral discs and vertebral bodies; and
specifying at least either the intervertebral discs or the vertebral bodies included in the medical image using at least one of a periodicity of distribution of the intervertebral disc candidates and a periodicity of distribution of the vertebral body candidates,
detecting at least one of a spine centerline and a spinal cord centerline from the medical image; and
generating a distribution of a feature amount indicating an intervertebral disc likeness and a feature amount indicating a vertebral body likeness by cumulatively adding the feature amount indicating the intervertebral disc likeness and the feature amount indicating the vertebral body likeness on at least one of the spine centerline and the spinal cord centerline with a sign of the feature amount indicating the intervertebral disc likeness or the feature amount indicating the vertebral body likeness being inverted,
wherein the specifying of at least either the intervertebral discs or the vertebral bodies included in the medical image is based on the distribution of the feature amount indicating the intervertebral disc likeness and the feature amount indicating the vertebral body likeness.

14. A non-transitory computer readable medium storing a medical image processing program causing as a computer to execute:
a procedure of detecting intervertebral disc candidates and vertebral body candidates from a medical image including intervertebral discs and vertebral bodies; and
a procedure of specifying at least either the intervertebral discs or the vertebral bodies included in the medical image using the intervertebral disc candidates and the vertebral body candidates,
wherein the procedure of specifying specifies at least either the intervertebral discs or the vertebral bodies included in the medical image based on periodicity of a distribution of the intervertebral disc candidates and the vertebral body candidates,
a procedure of centerline detection that detects at least at least one of a spine centerline and a spinal cord centerline from the medical image; and
a procedure of distribution generation that generates a distribution of a feature amount indicating the intervertebral disc likeness and a feature amount indicating the vertebral body likeness by cumulatively adding the feature amount indicating the intervertebral disc likeness and the feature amount indicating the vertebral body likeness on at least one of the spine centerline and the spinal cord centerline with a sign of the feature amount indicating the intervertebral disc likeness or the feature amount indicating the vertebral body likeness being inverted,
wherein the procedure of specifying specifies at least either the intervertebral discs or the vertebral bodies included in the medical image based on the distribution of the feature amount indicating the intervertebral disc likeness and the feature amount indicating the vertebral body likeness.

* * * * *